US010649070B2

(12) United States Patent
Liu et al.

(10) Patent No.: US 10,649,070 B2
(45) Date of Patent: May 12, 2020

(54) METHOD FOR REGIONAL ATTENUATION CORRECTION OF RADAR USING A MICROWAVE LINKS NETWORK

(71) Applicant: National University of Defense Technology, Changsha (CN)

(72) Inventors: Xichuan Liu, Changsha (CN); Taichang Gao, Changsha (CN); Yang Xue, Changsha (CN); Peng Zhang, Changsha (CN); Kun Song, Changsha (CN); Yan Ma, Changsha (CN)

(73) Assignee: NATIONAL UNIVERSITY OF DEFENSE TECHNOLOGY, Changsha (CN)

( * ) Notice: Subject to any disclaimer, the term of this patent is extended or adjusted under 35 U.S.C. 154(b) by 332 days.

(21) Appl. No.: 15/800,485

(22) Filed: Nov. 1, 2017

(65) Prior Publication Data

US 2018/0120418 A1 May 3, 2018

(30) Foreign Application Priority Data

Nov. 2, 2016 (CN) .......................... 2016 1 0951079

(51) Int. Cl.
*G01S 7/41* (2006.01)
*G01S 13/95* (2006.01)
*G01S 7/40* (2006.01)

(52) U.S. Cl.
CPC ................ *G01S 7/41* (2013.01); *G01S 7/40* (2013.01); *G01S 13/95* (2013.01); *G01S 13/951* (2013.01); *Y02A 90/18* (2018.01)

(58) Field of Classification Search
CPC ..... G01S 7/41; G01S 7/40; G01S 13/95; G01S 13/951
See application file for complete search history.

(56) References Cited

U.S. PATENT DOCUMENTS

2011/0018757 A1\* 1/2011 Mizutani ................. G01S 7/025
342/26 R
2013/0271313 A1\* 10/2013 Venkatachalam ....... G01S 13/95
342/26 R

OTHER PUBLICATIONS https://www.xycoon.com/least_squares_criterion.htm.

\* cited by examiner

*Primary Examiner* — Marc Anthony Armand
(74) *Attorney, Agent, or Firm* — Treasure IP Group, LLC

(57) ABSTRACT

The complex temporal-spatial variation of raindrop size distribution will affect the precision of quantitative precipitation estimation (QPE) produced from radar data, making it difficult to correct echo attenuation. This invention presents a method for regional attenuation correction of weather radar using a multiple microwave links (ML) network. By measuring the rain attenuation of multiple microwave links in a specific frequency, matching with the weather radar in time and space and processed with discretization. Based on a series of attenuation values of the microwave link network and combined iterations, the attenuation coefficient of each grids is obtained; the total attenuation value of the path is obtained by combining the distance between the radar and each grid point, by which the reginal attenuation of radar echo can be corrected by the ML network efficiently.

5 Claims, 2 Drawing Sheets

METHOD FOR REGIONAL ATTENUATION CORRECTION OF RADAR USING A MICROWAVE LINKS NETWORK

CROSS REFERENCE TO RELATED APPLICATION

This application claims priority to a Chinese Application No. 201610951079.5 filed on Nov. 2, 2016. The Chinese Application is incorporated herein by reference in its entirety.

BACKGROUND

Field of the Invention

The present invention discloses a method for regional attenuation correction of weather radar using a distributed microwave-links network. The present invention relates to the field of measuring rainfall by weather radar.

Description of Prior Art

The attenuation of precipitation on the propagation of electromagnetic waves is one of the main factors that affect the quantitative precipitation estimation (QPE) by weather radar. The attenuation effect will cause a decrease in radar echo intensity and detection area. In particular, at relatively far distances, radar reflectivity factors are lower than actual values, and cannot reflect the actual distribution of rainfall. The quantitative precipitation estimation (QPE) by weather radar is still a problem due to the attenuation. In some weather radar applications, researchers desire to measure the actual attenuation along the propagation path to improve the effect of attenuation correction.

A new approach for rainfall measurement was recently presented using the attenuation of microwave links caused by rainfall. There are several cellular communication systems, microwave relay communication systems in the scanning area of weather radar, and the microwave propagation attenuation can be obtained by detecting the receive signal level (RSL) from the transmitter and receiver of a microwave link. During a rainfall event, the microwave is attenuated by falling raindrops when passing through the rain area. The microwave attenuation can be calculated by measuring the difference between clear and rainy days, the path integrated attenuation (PIA) of a single microwave link can be used to correct the attenuation of radar echo along the microwave path. Multiple microwave links can form a microwave links network with a certain topological structure, the area of network can be convert to the discrete grids, and the attenuation in each grid can be obtained by the computerized tomography (CT) imaging technology, based on which the attenuation of radar echo in the corresponding area can be corrected.

In the practical application, both the existing commercial microwave links in communication networks and building additional microwave links systems can be used to reginal attenuation correction of weather radar.

SUMMARY OF THE INVENTION

The object of the present invention is to provide a method for regional attenuation correction of weather radar by using a multiple microwave links network based on the tomographic reconstruction of attenuation coefficients, inversion techniques and attenuation correction modeling.

Particularly, the present invention provides a method for attenuation correction of weather radar comprising:

1. The attenuation A of microwave with a certain frequency band in a rainfall event can be obtained by the difference between clear day and rainy day:

$$A = T - T^{wet} \tag{1}$$

where T is the total attenuation in the path, and $T^{wet}$ is the attenuation reference during the rain.

2. Constructing a joint observation network of microwave links and weather radar data as shown in FIG. 1, match the radar data and microwave attenuation data with space and time, and discretize the corresponding area, as shown in FIG. 2.

3. Based on the rain attenuation of the microwave links network, a joint iterative reconstruction algorithm is used to obtain the rain attenuation coefficient $K_j$ of each grid.

1) Assuming the length of $i^{th}$ link is $L_i$, the attenuation induced by rain is $A_i$ $$A_i = \int_{L_i} K_j \, dl \tag{2}$$

Assuming the number of grids after discretization is N, the rain attenuation of the $i^{th}$ microwave link can be expressed as $$A_i = \sum_{j=1}^{N} l_{ij} K_j \tag{3}$$

where $l_{ij}$ is the length of the $i^{th}$ microwave link that passes through the $j^{th}$ grid; the unit of $K_j$ is (dB/km).

The rain attenuation of the M microwave links can be expressed in vector form:

$$LK = A \tag{4}$$

where $A = (A_i)_{M \times 1}$ is the total attenuation column vector; $L = (l_{ij})_{M \times N}$ is the distance matrix; $K = (k_j)_{N \times 1}$ is the attenuation coefficient column vector.

2) The solution of K can be convert to the equation (4) as follows:

$$\begin{cases} l_{11}k_1 + l_{12}k_2 + \cdots + l_{1j}k_j + \cdots + l_{1N}k_N = A_1 \\ l_{21}k_1 + l_{22}k_2 + \cdots + l_{2j}k_j + \cdots + l_{2N}k_N = A_2 \\ l_{i1}k_1 + l_{i2}k_2 + \cdots + l_{ij}k_j + \cdots + l_{iN}k_N = A_i \\ l_{M1}k_1 + l_{M2}k_2 + \cdots + l_{ij}k_j + \cdots + l_{MN}k_N = A_M \end{cases} \tag{5}$$

To minimize the error of Eq. (5), take the Simultaneous Iterative Reconstruction Technique (SIRT) for example to construct the cost function using the least-square criterion. The objective function was minimized by repeated iterations, and the optimal solution was obtained:

$$J(K) = (A - LK)^T (A - LK) = \min! \tag{6}$$

To obtain the minimum cost function, $$L^T A = L^T L K \tag{7}$$

the iterative formula needed to solve Eq. (5) can be written as $$k_j(t) = k_j(t-1) + \frac{1}{M}\sum_{i=1}^{N} \frac{\left(A_i(t) - \sum_{p=1}^{M} l_{ip}(t)k_p(t-1)\right) \cdot l_{ij}(t)}{\sum_{p=1}^{M} l_{ip}(t)^2} \quad (8)$$

4. The process of the corrected radar reflectivity factor is shown in FIG. 4. Assuming that there are X lines between each grid point and the radar, we can substitute the attenuation coefficients obtained into Equation (9). Then, we can get the path attenuation of the $i^{th}$ link between the radar and each grid:

$$Att_{ij} = \sum_{i=1}^{X} \sum_{j=1}^{N} k_j * d_{ij} \quad (9)$$

where $d_{ij}$ is the length of the $i^{th}$ link between the radar and the grid through the $j^{th}$ grid.

5. The corrected radar reflectivity factor $z_{ij}$ can be calculated by summing the radar-measured reflectivity factor $z_{m_{ij}}$ and total attenuation of the two-way path on the $i^{th}$ link between the radar and the grid:

$$z_{ij} = z_{m_{ij}} + 2*Att_{ij} \quad (10)$$

DESCRIPTION OF THE DRAWINGS

Various objects, features, and advantages of the present invention can be fully appreciated with reference to the following detailed description of the invention when considered in connection with the following drawings, in which like reference numerals identify like elements.

DETAILED DESCRIPTION OF THE EMBODIMENTS OF THE INVENTION

Figure 2:
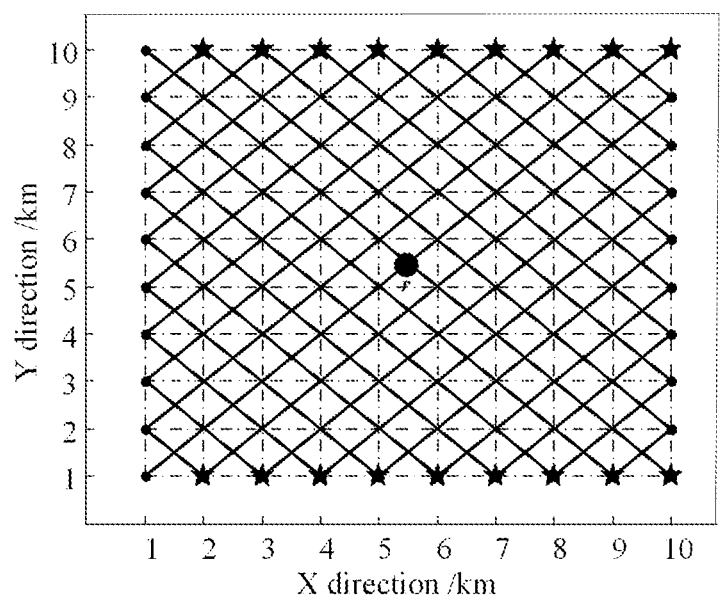
FIG. 2 is a graphical representation of the regional discrete diagram.
Figure 3:
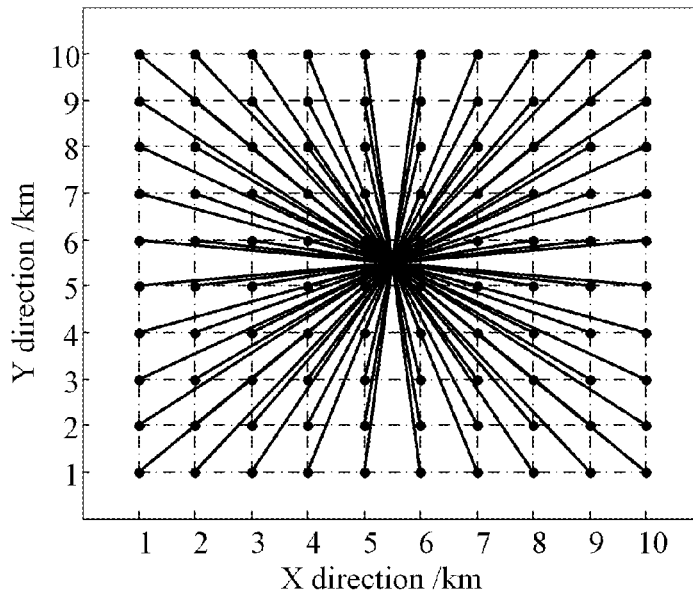
FIG. 3 is the location of radar and grids.
Figure 4:
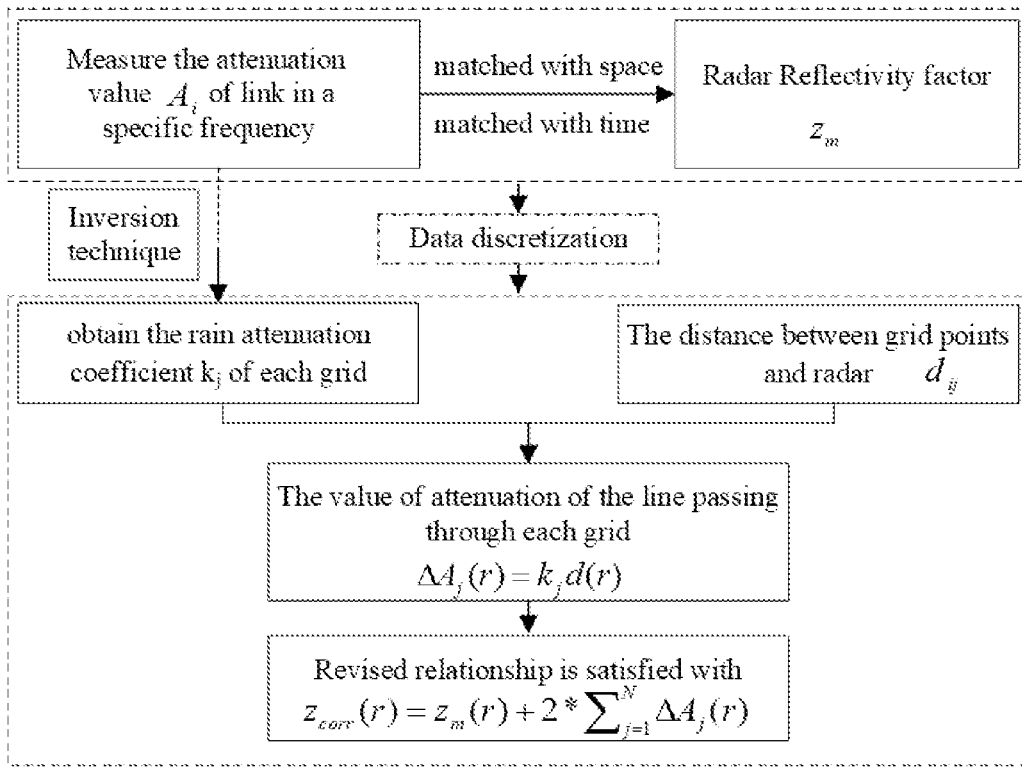
FIG. 4 is the flow chart of the attenuation correction.

As shown in FIG. 2, the reginal attenuation correction of radar echo by a multiple microwave links network includes following steps:

1. Measure the attenuation of the microwave link in the specific frequency.

In the attenuation correction method based on the microwave link, the path integral attenuation value can be obtained by the measurement of single frequency, dual frequency and multi-frequency links, which typically select the same or similar frequency as radar in single-frequency links, and in dual-frequency or multi-frequency microwave links select one of the frequency is the same or similar as radar, others are generally selected to meet the attenuated pairs of values of both link frequencies are highly correlated during the rain.

The detail process is:

1) In the clear day, the RSL of microwave links are measured and the baseline of clear attenuation $T^{dry}$ is obtained, the air temperature, pressure, and humidity are also recorded in the same time.

2) In a rainfall event, The RSL of microwave links are measured, the total attenuation in the path T can be obtained, the attenuation reference $T^{wet}$ during the rain is calculated by the difference between rainy day and clear day, and it is also modified by the atmospheric gas absorption model. The microwave attenuation A can be calculated by:

$$A = T - T^{wet} \quad (1)$$

Figure 1:
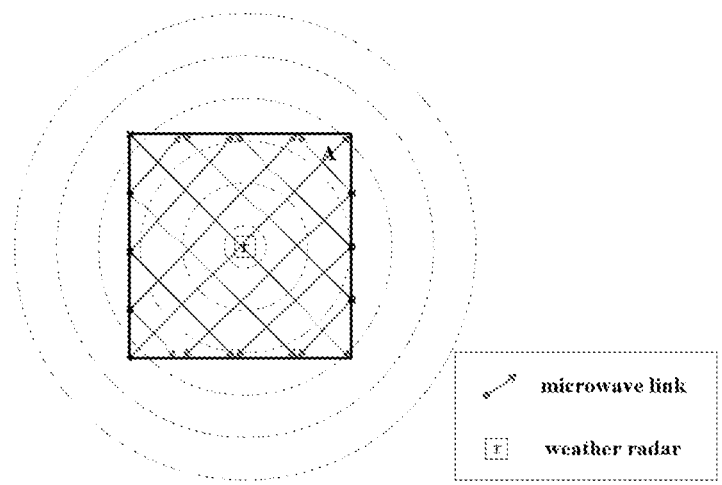
FIG. 1 is a graphical representation of a joint observation network of microwave links and weather radar.

2. Constructing a joint observation network of microwave links and weather radar data as shown in FIG. 1. The radar observation data and microwave attenuation data are matched with space and time, and the area is discretized, as shown in FIG. 2.

3. The attenuation due to the rain in each grid $K_j$ are obtained as follows.

1) Assuming the length of $i^{th}$ link is $L_i$, the attenuation induced by rain is $A_i$ $$A_i = \int_{L_i} K_j dl \quad (2)$$

Assuming the number of grids after discretization is N, the rain attenuation of the $i^{th}$ microwave link can be expressed as $$A_i = \sum_{j=1}^{N} l_{ij} K_j \quad (3)$$

where $l_{ij}$ is the length of the $i^{th}$ microwave link that passes through the $j^{th}$ grid; the unit of $K_j$ is (dB/km), and i=1 . . . M (M is the total number of microwave links).

The rain attenuation of the M microwave links can be expressed in vector form:

$$LK = A \quad (4)$$

where $A=(A_i)_{M\times1}$ is the total attenuation column vector; $L=(l_{ij})_{M\times N}$ is the distance matrix; $K=(k_j)_{N\times1}$ is the attenuation coefficient column vector.

2) The solution of K can be convert to the equation (4) as follows:

$$\begin{cases} l_{11}k_1 + l_{12}k_2 + \phantom{+}+l_{1j}k_j + \phantom{+}+l_{1N}k_N = A_1 \\ l_{21}k_1 + l_{22}k_2 + \phantom{+}+l_{2j}k_j + \phantom{+}+l_{2N}k_N = A_2 \\ l_{i1}k_1 + l_{i2}k_2 + \phantom{+}+l_{ij}k_j + \phantom{+}+l_{iN}k_N = A_i \\ l_{M1}k_1 + l_{M2}k_2 + \phantom{+}+l_{ij}k_j + \phantom{+}+l_{MN}k_N = A_M \end{cases} \quad (5)$$

To minimize the error of Eq. (5), take the Simultaneous Iterative Reconstruction Technique (SIRT) for example to construct the cost function using the least-square criterion. The objective function was minimized by repeated iterations, and the optimal solution was obtained:

$$J(K) = (A - LK)^T (A - LK) = \min! \quad (6)$$

To obtain the minimum cost function, $$L^T A = L^T L K \quad (7)$$

the iterative formula needed to solve Eq. (5) can be written as $$k_j(t) = k_j(t-1) + \frac{1}{M} \sum_{i=1}^{N} \frac{\left(A_i(t) - \sum_{p=1}^{M} l_{ip}(t)k_p(t-1)\right) \cdot l_{ij}(t)}{\sum_{p=1}^{M} l_{ip}(t)^2} \quad (8)$$

4. Assuming that there are X lines between each grid point and the radar, we can substitute the attenuation coefficients obtained from Eq. (6) into Eq. (9). Then, we can get the path attenuation of the $i^{th}$ link between the radar and each grid point:

$$Att_{ij} = \sum_{i=1}^{X} \sum_{j=1}^{N} K_j \times d_{ij}. \quad (9)$$

where $d_{ij}$ is the length of the $i^{th}$ link between the radar and the grid point through the $j^{th}$ grid.

5. The corrected radar reflectivity factor $z_{ij}$ can be calculated by summing the radar-measured reflectivity factor $z_{m_{ij}}$ and total attenuation of the two-way path on the $i^{th}$ link between the radar and the grid point:

$$z_{ij} = z_{m_{ij}} + 2 \times Att_{ij}. \quad (10)$$

The derivation process are as follows.

1) the relationship between radar measured reflectivity factor $Z_m$ (mm$^6$/m$^3$) and the true reflectivity factor $Z_r$ (mm$^6$/m$^3$) is $$Z_m(r) = Z_r(r) * K = Z_r(r) * 10^{-0.2 \int_0^R k dr} \quad (11)$$

where r is the distance between target and radar, K is the attenuation factor, k is the attenuation coefficient (dB/km).

$$z = 10 \log Z \quad (12)$$

where the unit of z is dB, the unit of Z is mm$^6$/m$^3$.

2) Eq. (11) can be convert in the unit of dB as follows.

$$z_r(r) = z_m(r) + 2\int_0^R k dr \quad (13)$$

where the second item in right side of equation (13) is the path integrated attenuation of radar.

We claim:

1. A method for regional attenuation correction of a weather radar, comprising
1) constructing a multiple microwave links network, based on the tomographic reconstruction, each microwave link includes a transmitter and receiver;
2) measuring microwave attenuation (A) of the multiple microwave links in specific frequencies (T and T$^{wet}$), and calculating microwave attenuation (A) by:

$$A = T - T^{wet} \quad (B)(2)$$

wherein A (dB) is attenuation induced by rain in a link path, and T$^{wet}$ (dB) is the attenuation reference during the rain, which is calculated by the difference between rainy day and clear day;
3) constructing a joint observation network between multiple microwave links and observed weather radar data by matching the observed weather radar data to microwave attenuation data according to location and time information, and
then performing
discretizing the weather radar data observed by presenting in a discrete grid, for a corresponding regional area by
obtaining the attenuation induced by rain is $A_i$ (dB), for an $i^{th}$ link with length $L_i$ (km), $$A_i = \int_{L_i} K_j dl \quad (C)$$

wherein there are M microwave links are provided in the observation area, and the observation area is discretized in N grids;
$K_j$ (dB/km) is a rain attenuation coefficient in each grid; and
obtaining the rain attenuation of $i^{th}$ link $A_i$ (dB) for a discretized grid area by calculating:

$$A_i = \sum_{j=1}^{N} l_{ij} K_j \quad (D)$$

wherein $l_{ij}$ (km) is a length of the $i^{th}$ link in a $j^{th}$ grid cell, $K_j$ (dB/km) is the rain attenuation coefficient in each grid cell;
4) using a rain attenuation from the multiple microwave links network, wherein rain attenuation of the M microwave links can be expressed in vector form:

$$LK = A \quad (E)$$

$A = (A_i)_{M \times 1}$ is the total attenuation column vector;
$L = (l_{ij})_{M \times N}$ is the distance matrix;
$K = (k_j)_{N \times 1}$ is the attenuation coefficient column vector, using a joint iterative reconstruction algorithm to obtain rain attenuation coefficient $k_j$ of each grid cell and converting solution of k to the equation (F) as follows:

$$\begin{cases} l_{11}k_1 + l_{12}k_2 + \ldots + l_{1j}k_j + \ldots + l_{1N}k_N = A_1 \\ l_{21}k_1 + l_{22}k_2 + \ldots + l_{2j}k_j + \ldots + l_{2N}k_N = A_2 \\ \vdots \\ l_{i1}k_1 + l_{i2}k_2 + \ldots + l_{ij}k_j + \ldots + l_{iN}k_N = A_i \\ \vdots \\ l_{M1}k_1 + l_{M2}k_2 + \ldots + l_{ij}k_j + \ldots + l_{MN}k_N = A_M \end{cases} \quad (F)$$

wherein $l_{ij}$ (km) is a length of the $i^{th}$ link in a $j^{th}$ grid cell, M is the number of microwave links and N is a number of the grid cells;
taking Simultaneous Iterative Reconstruction Technique (SIRT) to construct a cost function using the least-square criterion and an iterative formula can be written as $$k_j(t) = k_j(t-1) + \frac{1}{M} \sum_{i=1}^{N} \frac{\left(A_i(t) - \sum_{p=1}^{M} l_{ip}(t)k_p(t-1)\right) \cdot l_{ij}(t)}{\sum_{p=1}^{M} l_{ip}(t)^2} \quad (G)$$

5) calculating the path attenuation of the $i^{th}$ link between the weather radar and each grid point:

$$Att_{ij} = \sum_{i=1}^{X} \sum_{j=1}^{N} k_j \times d_{ij}. \quad (12)$$

wherein $d_{ij}$ is the length of the $i^{th}$ link between the weather radar and the grid point through the $j^{th}$ grid;

6) providing X lines between each grid point and the weather radar, substituting the attenuation coefficients obtained into Eq. (10) and obtaining the path attenuation of the $i^{th}$ link between the weather radar and each grid:

$$Att_{ij}=\Sigma_{i=1}^{X}\Sigma_{j=1}^{N}k_j*d_{ij} \qquad (10)$$

wherein $d_{ij}$ (km) is the length of a $i^{th}$ link between the weather radar and the grid through a $j^{th}$ grid;

7) calculating corrected radar reflectivity factor $z_{ij}$ by summing radar-measured reflectivity factor $z_{m_{ij}}$ and total attenuation of two-way path on the $i^{th}$ link between the weather radar and the grid point:

$$z_{ij}=z_{m_{ij}}+2\times Att_{ij}. \qquad (13)$$

2. The method according to claim 1, characterized in that the attenuation of the microwave link can be measured based on a single frequency, dual frequency and multi frequency links.

3. The method according to claim 1, characterized in that the data comes from the simultaneous measurement of the multiple microwave links and the weather radar.

4. The method according to claim 1, characterized in that including but not limited to the joint iterative reconstruction algorithm to obtain the rain attenuation coefficient $K_j$ of each grid cell.

5. The method of claim 1, further comprising obtaining an optimal solution, through minimizing objective function and repeated iterations according to $$J(K)=(A-LK)^T(A-LK)=\min! \qquad (7)$$

and obtaining a minimum cost function, by $$L^TA=L^TLK \qquad (8).$$

* * * * *